March 26, 1963  H. E. THORNHILL  3,083,043
TAPER THREAD SYSTEM FOR COUPLING OR JOINT
Filed June 25, 1956  4 Sheets-Sheet 1

Homer E. Thornhill
INVENTOR.

BY
Browning, Simms + Hyer
ATTORNEYS

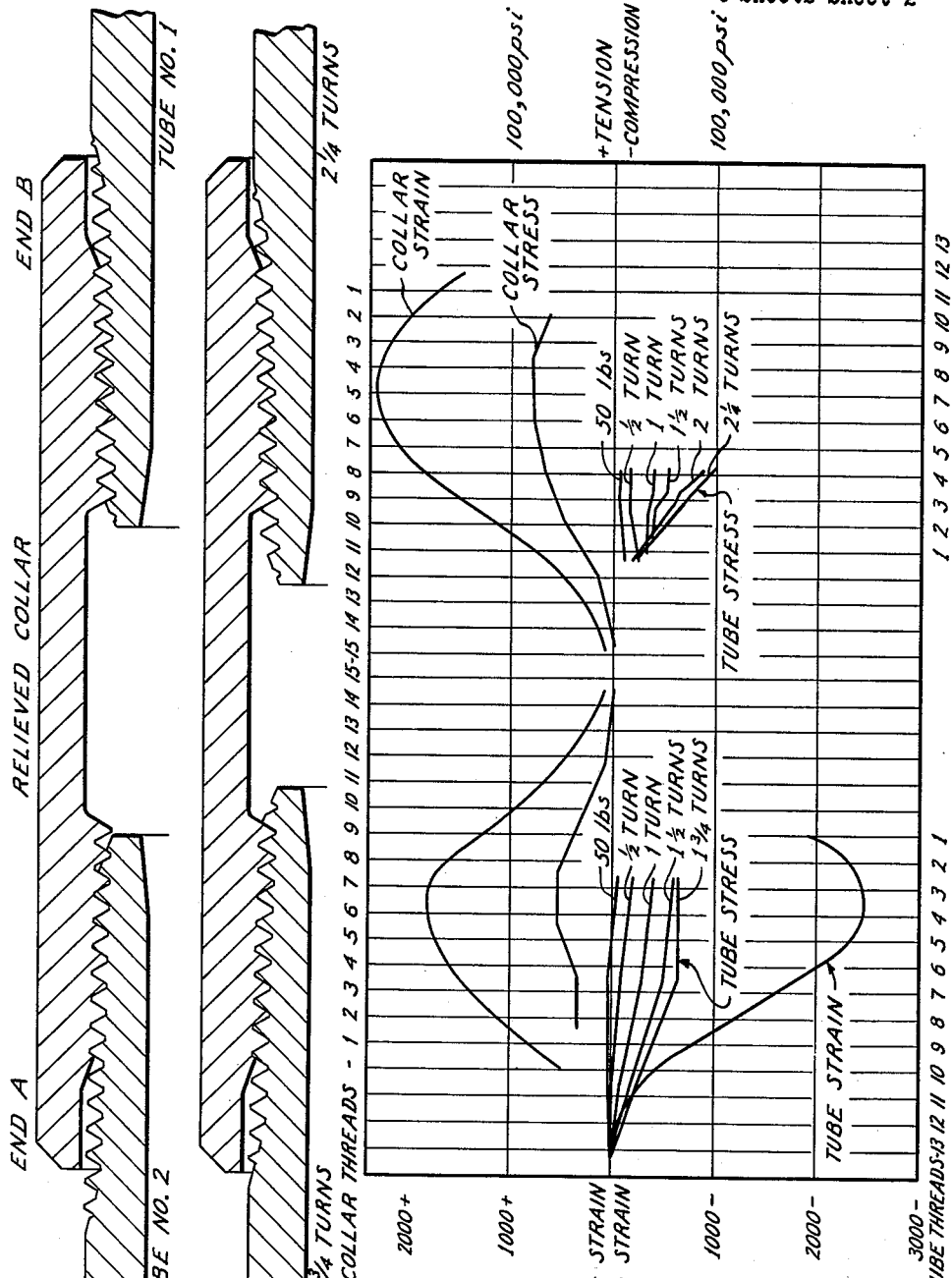

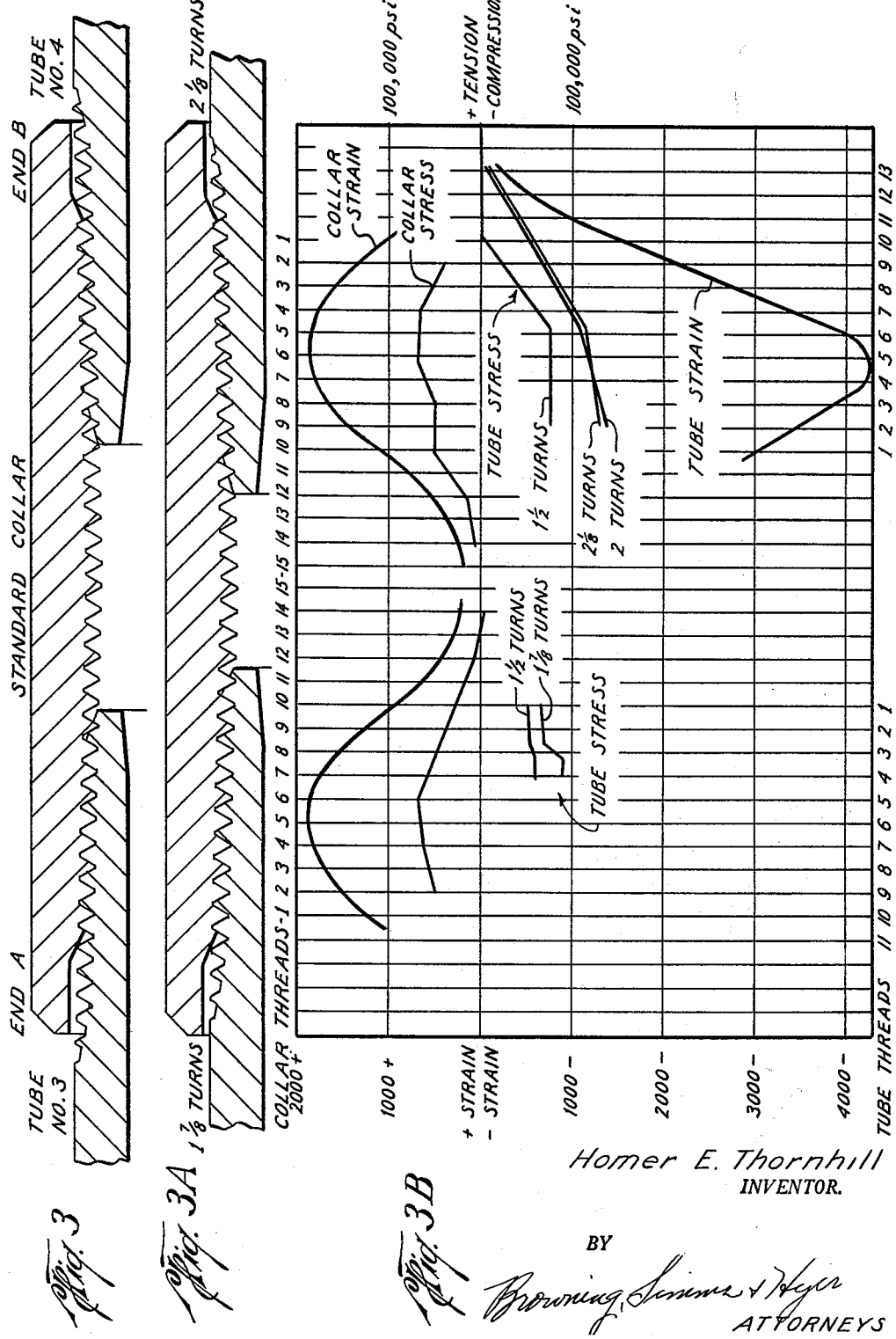

March 26, 1963
H. E. THORNHILL
3,083,043
TAPER THREAD SYSTEM FOR COUPLING OR JOINT
Filed June 25, 1956
4 Sheets-Sheet 4
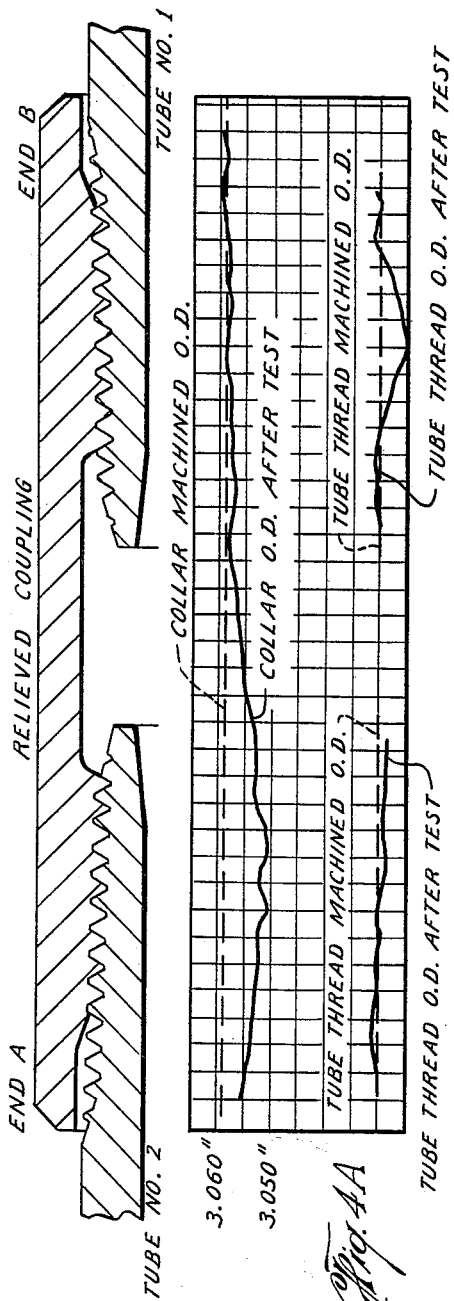
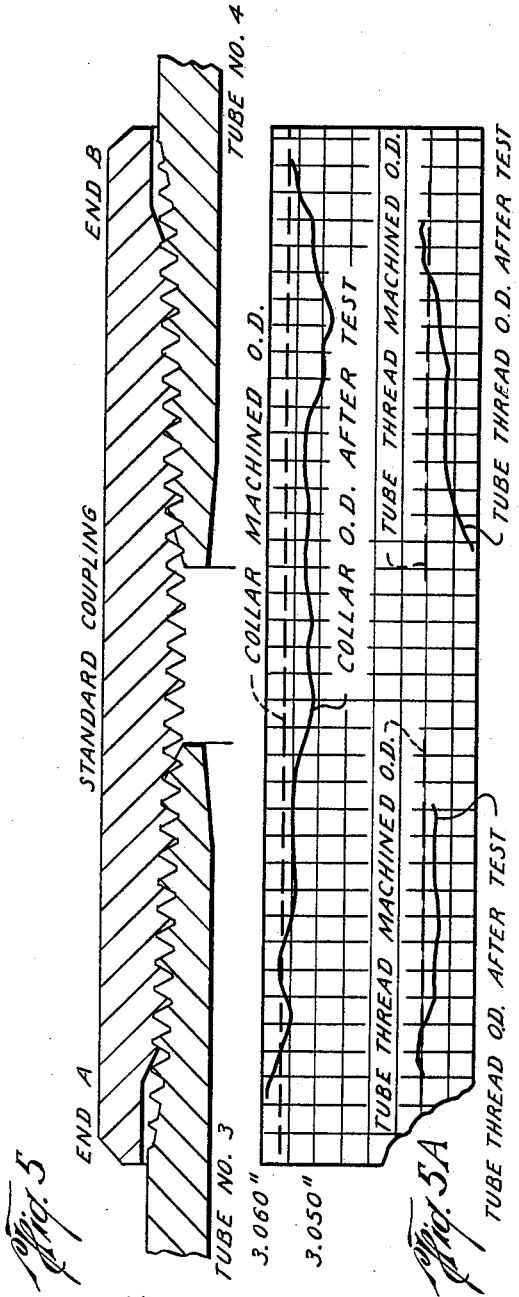
Homer E. Thornhill
INVENTOR.
BY
Browning, Simms & Hyer
ATTORNEYS

United States Patent Office 3,083,043
Patented Mar. 26, 1963

3,083,043
TAPER THREAD SYSTEM FOR COUPLING OR JOINT
Homer E. Thornhill, Houston, Tex., assignor to Thornhill-Craver Company, Inc., Houston, Tex., a corporation of Texas
Filed June 25, 1956, Ser. No. 593,636
5 Claims. (Cl. 285—333)

This invention relates to threaded connections and more particularly to a tapered thread system between male and female members, such as pipes and pipe couplings.

Tapered thread joints of conventional type have a high percentage of leaks under high pressure. Thread sealing compounds are generally used to insure a seal, but high pressure will frequently extrude the compound out of the threads. Contact of the threads of a thread system maintains sealing compounds in the thread system. Any change in the taper of either or both of the internal or external threads increases clearance between threads and permits the compound to be extruded under high pressure. Conventional tapered thread systems inherently go off angle on make-up (i.e., the angle of taper changes) and clearance between threads is such that a high percentage of leaks will occur. For instance, it is generally considered that a two inch EUE thread system will leak around 6,000 or 7,000 p.s.i. The American Petroleum Institute recognizing the deficiency of the conventional threaded joint has ruled it out in standards for internal pressures including and beyond 10,000 p.s.i.; favoring other methods of attachment.

Theoretically, the internal and external threads of a tapered thread system are in perfect engagement. In practice, however, manufacturing tolerances permit a wide divergence in all dimensions of the threads. Not only may the tapers of a coupling and pipe vary so that initial contact is at the end of the pipe or at the end of the coupling, but the fit at the truncated roots and crests may vary from interference to clearance. In the interference situation, a helical leakage path along the flanks of the threads is present. In the clearance situation, a helical leakage path between the roots and crests is present. These leakage paths are closed by making up the thread system with sufficient torque to cold flow the threads and close the leakage paths. Where one of the thread parts is fabricated from highly ductile material, satisfactory results will normally be obtained. Where both thread parts are fabricated from material of low ductility such as, N–80 Steel, API STD 5A, 19 edition, March 1954, a publication of the American Petroleum Institute, consistent seals against high pressure will not be provided by conventional joints and a substantial percentage of reworks is necessary.

Various reasons have been advanced for the failure of conventional tapered threads to seal consistently against high pressure. It is my present belief that failure to seal is primarily due to the fact that the torque applied to cause cold flow and sealing between tapered threaded pipes and couplings causes collapse of a pipe from its nose back along the thread and the pipe and/or coupling to go off angle. The pipe wall thickness increases away from the end of the pipe. Therefore, as strain on the threads is increased to cold flow the threads, the pipe collapses at its weakest point. As the strain is further increased, the collapse progresses along the pipe from its end. As the collapse of the end of the pipe destroys much of the elastic contact between the pipe and coupling, the contact pressure is reduced and the thread system is rendered more prone to leak under high pressure. The nose of the pipe is constantly being moved into an annulus of smaller diameter than the outer diameter of the pipe. This causes the coupling to flare outwardly beginning at the nose of the pipe and extending back along the pipe several threads. The resulting off angle of the coupling thread allows sealant to be displaced by internal pressure resulting in leakage.

When thread systems are subjected to tremendous axial pulls such as, in the drilling and production of wells, the threads sometimes jump and permit a string of pipe to separate. It is believed that over straining of the thread system to obtain a seal is a major contributing factor in causing pipe strings to part at a coupling.

The area of engagement of threads of a conventional tapered thread system varies with make-up. Resistance to make-up due to the end of the male thread entering a small diameter area of the female thread also varies. These variables make it very difficult to calculate behavior of a thread system particularly in view of manufacturing tolerances.

It is an object of this invention to provide a tapered thread system that can be made-up without permanent damage to the thread system and that will seal effectively and repeatedly against high pressure.

Another object is to provide a tapered thread system that does not go off angle during make-up.

Another object is to provide a tapered thread system having a fixed area of thread engagement in which inter-engagement of the fixed area of engagement is the only limitation on the extent of make-up.

Another object is to provide a tapered thread system which will consistently seal against high pressure; which may be used, broken out, and made-up again without substantially impairing the sealing quality of the thread system.

Another object is to provide a tapered thread system for a pipe coupling and pipe in which a seal may consistently be obtained against high pressure without collapsing the end of the pipe.

Another object is to provide a tapered thread system for a pipe coupling and pipe in which the pipe, the weaker of the two members, is strengthened against collapse without increasing the wall thickness of the pipe.

Another object is to provide a tapered thread system for a pipe coupling and pipe in which maximum circumferential stresses on the pipe are lower than in the standard tapered thread systems in use today such as, the API thread system.

Another object is to provide a tapered thread system in which the ratio of thread contact pressure to internal pressure uniformly increases and then decreases along the thread axis and provides an unbroken seal area along a substantial length of the thread system.

Another object is to provide a tapered thread system in which the ratio of thread contact pressure to internal pressure is greater than in a conventional tapered thread system subjected to the same internal pressure and made-up the same number of turns.

Another object is to provide a tapered thread system which is more uniformly loaded than the conventional tapered thread systems in use today.

Other objects, features and advantages of this invention will be apparent from the specification, drawings and claims.

In the drawings, wherein there is shown by way of illustration, an embodiment of this invention and wherein like numerals indicate like parts:

FIG. 2 is a longitudinal fragmentary section through a coupling embodying this invention and two pipes made-up therein to hand-tight position;

FIG. 2A is a longitudinal fragmentary section through the coupling of FIG. 2 with the pipes shown in their fully made-up position;

FIG. 2B is a graph correlated with FIGS. 2 and 2A giving a graphical presentation of circumferential stresses and strains on the coupling and pipes when fully made-up and circumferential stresses on the pipes at various rotative positions between hand-tight and fully made-up position;

FIG. 3 is a longitudinal fragmentary section through a conventional form of coupling and pipes threaded therein with the pipes in hand-tight position;

FIG. 3A is a longitudinal fragmentary section through the coupling and pipes of FIG. 3 with the pipes in fully made-up position;

FIG. 3B is a graph correlated with FIGS. 3 and 3A giving a graphical presentation of circumferential stresses and strains on the coupling and pipes with the pipes in their fully made-up position and stresses on the pipes at various rotative positions between hand-tight and fully made-up position;

FIG. 4 is a longitudinal fragmentary section identical with FIG. 2A being duplicated for the purpose of correlation with FIG. 4A;

FIG. 4A is a graph correlated with FIG. 4 giving the outside diameters of the coupling and pipes of FIG. 4 after they had been fully made-up, subjected to elevated pressure and tension and broken out;

FIG. 5 is a longitudinal fragmentary section identical with FIG. 3A, being duplicated for the purpose of correlation with FIG. 5A;

Figure 6:
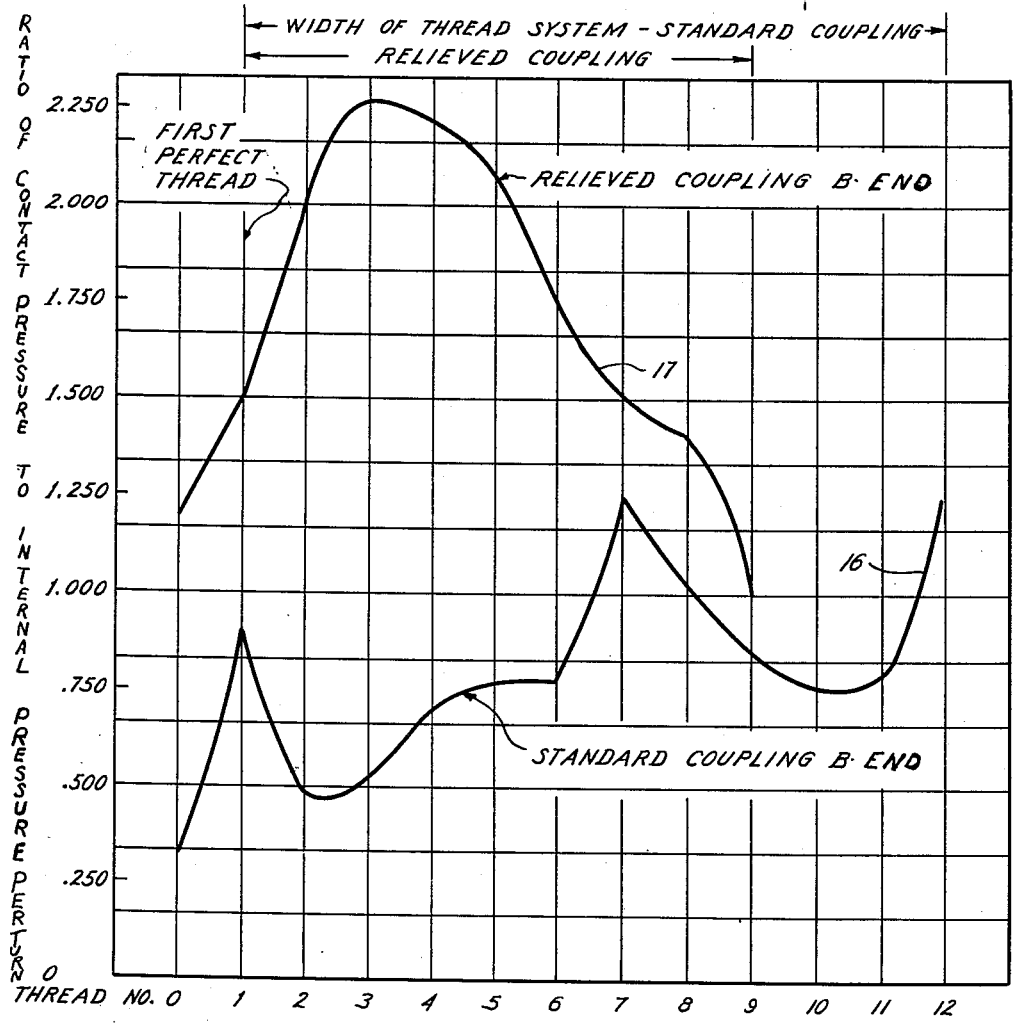

FIG. 5A is a graph correlated with FIG. 5 giving the diameters of the coupling and pipes after they had been fully made-up, subjected to pressure and tension of the same magnitude as the coupling of FIG. 4 and then broken out; and FIG. 6 is a graphical comparison of the variations in ratio of contact pressure to internal pressure per turn for the B end of the coupling of FIG. 3 which employs the conventional thread system with such variations for the B end of the coupling of FIG. 2 which employs a thread system constructed in accordance with this invention.

The thread system of this invention may be used in any situation where it is desired to couple two parts together and seal between said parts against high pressure.

In fabricating the thread system, the male or externally threaded part is formed in the usual manner to any convenient standard. The female or internally threaded part is formed in the conventional manner to the same standard except that the thread length of the internal thread is shortened and space for the end of the male part to move into the female part beyond the internal thread without substantial contact with the wall of the female part beyond such threads is provided. The thread length of the internal thread should be such that the small diameter end of the male thread is substantially at or extends through the small diameter end of the female thread when the parts are in hand-tight relationship, that is, made-up with 50 ft. lbs. of torque.

The provision of space at the small diameter end of the internal thread into which the male member may move without contact, may be provided by a groove in the internal wall of the female member. The groove should begin at the small diameter end of the internal thread and should be dimensioned axially and radially to receive the end of the male member as the thread system is rotated from hand-tight to fully made-up position.

Figure 1:
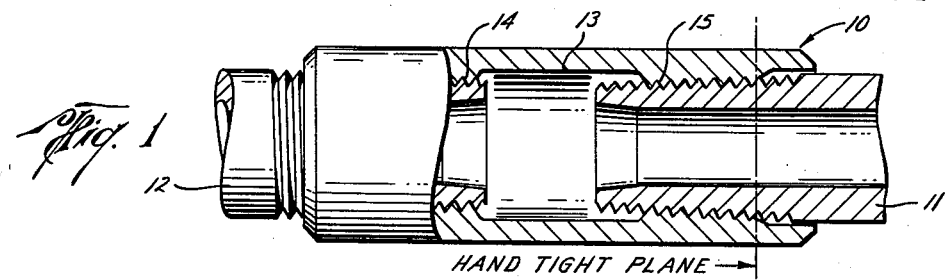
FIG. 1 is a view partly in elevation and partly in longitudinal cross-section through a coupling and two pipes secured therein illustrating this invention.

Referring now to the drawings, there is shown at FIG. 1, a thread system including a coupling or collar indicated generally at 10 interconnecting two pipes or tubes 11 and 12. The pipe 12 is made-up hand-tight. The pipe 11 is fully made-up. The coupling 10 and pipes 11 and 12 conform to API STD 5A, nineteenth edition, a publication of the American Petroleum Institute, for external 2 inch upset tubing and coupling, except that the center section of internal threads of the coupling have been relieved to form a groove 13 extending between the internal threads 14 and 15 in each end of the coupling.

The axial thread length of the internal threads 14 and 15 should be such that the pipes 11 and 12 will extend substantially the length of the internal thread in the coupling in hand-tight position and engage substantially all of the internal thread. It is preferred that the pipes extend completely through the internal thread and slightly beyond the small diameter end of the internal thread when in hand-tight position as shown in the relationship between coupling 10 and pipe 12. With the internal threads dimensioned to provide the hand-tight relationship shown between the coupling and pipe 12, the pipe and coupling may be rotated relative to each other to full made-up position, and the pipe and coupling will assume the relative relationship indicated between the coupling 10 and pipe 11. API specifications presently require that make-up of 2 inch upset tubing from hand-tight to fully made-up position be two full turns. With this invention, a seal against high pressure will usually be provided by a lesser number of turns, but two turns may be used.

Conveniently, the maximum thread length of the internal thread may be determined from the standard to which the thread system is fabricated, as substantially the length from the small diameter end of the external thread to the hand-tight plane with the parts in hand-tight relationship. This dimension is normally given in conventional standards of thread manufacture. The hand-tight plane is normal to the thread axis and passes through the beginning of the first perfect thread in the coupling. Preferably, the internal thread is one or two thread convolutions less than the distance from the small end of the external thread to the hand-tight plane. In determining the internal thread length, manufacturing tolerances should be kept in mind. API standard 5A specifies ±1 thread for 8 thread external upset tubing. Thus, a coupling for use with such tubing should be dimensioned to position the end of the tube at least one thread convolution beyond the internal thread to allow for this tolerance, if it is desired to have the external thread extend completely through the internal thread. While API standards are frequently referred to herein, the thread system of this invention may be fabricated using any convenient standard as a substitute for the API standard.

It will be noted that groove 13 has a radial dimension which completely clears the ends of the pipes 11 and 12 as they move to full made-up relationship with the coupling, and that an adaquate axial dimension is provided so that the ends of the pipes will not engage each other. The groove extends between the internal threads so that the only engagement between the pipes and the coupling is through the thread systems.

It will be appreciated that in the above-described embodiment of the invention, the thread contact area is constant for any degree of make-up, that is, all of the internal threads are engaged at one turn, one and one-half turns, etc. The nose of the tube will not be in abutment with any portion of the coupling and logitudinal resistance to make-up will be a constant. Having these factors as constants will greatly simplify calculation of thread system behavior.

Comparative tests between a thread system employing this invention and a thread system constructed in accordance with API specifications has proved that circumferential stresses developed between the thread surfaces in making up the thread system are less in a thread system constructed in accordance with this invention. The circumferential stresses are more evenly distributed throughout the thread system and the ends of the tubes are not collapsed during make-up of the system.

In conducting the tests referred to above, test specimens were prepared from a bar of N80 stock, yield strength 81,410 p.s.i., ultimate strength 108,500 p.s.i. The specimens were prepared according to API STD 5A, nineteenth edition for two and three-eighths external-upset tubing and two and three-eighths external-upset tubing coupling. Four tubes and one coupling conformed to dimensions prescribed. The other coupling, which will be referred to as the relieved coupling, conformed to specification except that an annular recess was provided in the center of the coupling located at 1.659 inches from each face of the coupling. The axial dimension of the recess was 1.557 inches. The diameter of the recess was 2.611 inches.

In conducting each test, two tubes were rotated into one of the couplings until they were tightened an average of two turns from hand-tight position. Strain gauges were positioned about the exterior of each coupling, within the relieved coupling in the center section thereof, and within each tube. Strain gauge readings were taken during make-up. The torque load was removed before strain measurements were taken to eliminate strain due to the torque load.

The specimens were then subjected to tension loads applied axially to the tubes in increments up to a maximum of 104,340 pounds.

While maintaining the maximum tension load, an internal pressure was applied in increments of 2,000 p.s.i. until a maximum pressure of 11,200 p.s.i. was reached. As the internal pressure was increased, the tension load was reduced by an amount equal to the internal pressure times the inside cross-sectional area of the tubes. This reduction in tension was made due to the internal pressure causing an axial tensional force on the blanked ends of the tube specimens.

The strain curves shown in FIGS. 2B and 3B are plots of circumferential strain along the outside of the couplings and the inside of the tubes with the thread systems fully made-up but not subjected to internal pressure or tensional load. The positive strain curves are strain on the couplings and the negative strain curves are strain on the tubes. The left hand ordinate is plotted in microinches per inch. The right hand ordinate is in pounds per square inch. The upper abscissas indicate coupling thread position and the lower abscissas indicate approximate tube thread position. In FIG. 2B, the numbers 10–15, both inclusive, along the upper side of the figure, indicate the positions threads in the coupling would occupy if the collar were threaded in the ordinary manner. Stresses on the exterior of the couplings and the interior of the tubes were calculated using as a basis, the reduced data resulting from the direct strain gauge readings and are also plotted in FIGS. 2B and 3B. It should be noted that the tube stress curves should be displaced for the different number of turns, but all curves are plotted for convenience for the final position of the tubes. FIGS. 2 and 3 show the actual hand-tight relationship of the collars and pipes tested and FIGS. 2A and 3A show the actual full made-up relationship of the collars and pipes tested.

Table I below is a summary of the principal circumferential and longitudinal coupling stresses for the standard coupling. Table II below is a summary of the principal circumferential and longitudinal coupling stresses for the relieved coupling. Table III is a summary of stresses inside the relieved coupling. Table IV is a summary of the principal circumferential and longitudinal tubing make-up stresses in the standard coupling. Table V is a summary of the principal circumferential and longitudinal tubing make-up stresses in the relieved coupling.

The coupling ends and tubing ends referred to in the tables are labeled in the drawings with the left hand end of the couplings being the A end and the right hand end of the couplings being the B end. The right hand tube of the relieved coupling is tube No. 1, the left hand tube of the relieved coupling is tube No. 2, the left hand tube of the standard coupling is tube No. 3 and the right hand tube of the standard coupling is tube No. 4.

TABLE I

*Summary of Principal (Circumferential and Longitudinal) Coupling Stresses*

STANDARD COUPLING

Sign convention:

+ (omitted) tension
− compression

[NOTE: All stresses are for final stage of loading indicated and are in thousands of pounds per square inch]

| Approx. thread No. | Gage numbers | | Loading condition: End A | | |
|---|---|---|---|---|---|
| | Circum. | Long. | Made-up | Made-up +tens.¹ | Made-up +tens.,² +pres.³ |
| 2 | 47 | | 48.8 | 41.2 | 60.0 |
| 1 | | 49 | 10.9 | 23.9 | 33.6 |
| 4 | 50 | | 61.8 | 45.5 | 66.2 |
| 3 | | 52 | 25.0 | 30.4 | 44.5 |
| 6 | 53 | | 67.0 | 44.5 | 62.9 |
| 5 | | 55 | 38.0 | 38.0 | 40.1 |
| 8 | 56 | | 49.9 | 39.1 | 55.3 |
| 9 | | 58 | 8.7 | 44.5 | 35.8 |
| 10 | 59 | | 27.1 | 19.5 | 39.1 |
| 9 | | 61 | 8.7 | 45.6 | 35.8 |
| 12 | 62 | | 6.5 | 2.2 | 35.8 |
| 13 | | 64 | −30.3 | 14.1 | 24.3 |
| 14 | 65 | | −5.4 | −4.3 | 27.1 |
| 13 | | 67 | −32.5 | −11.9 | 25.0 |
| 15 | 95 | | −2.3 | −3.3 | 31.5 |
| 15 | | 97 | −32.6 | −17.4 | −33.6 |

Table I—Continued

| Approx. thread No. | Gage numbers | | Loading condition: End B | | |
|---|---|---|---|---|---|
| | Circum. | Long. | Made-up | Made-up +tens.[1] | Made-up +tens.,[2] +pres.[3] |
| 2 | 68 | | 43.4 | 33.6 | 53.2 |
| 1 | | 70 | 11.9 | 23.9 | 53.2 |
| 4 | 71 | | 66.2 | 46.7 | 67.3 |
| 3 | | 73 | 30.4 | 31.5 | 42.3 |
| 6 | 74 | | 68.4 | 44.5 | 64.0 |
| 5 | | 76 | 34.7 | 35.8 | 39.1 |
| 8 | 77 | | 51.0 | 41.2 | 56.4 |
| 9 | | 79 | 17.4 | 55.3 | 45.6 |
| 10 | 80 | | 52.1 | 34.7 | 53.1 |
| 9 | | 82 | 21.7 | 56.4 | 45.0 |
| 12 | 83 | | 14.1 | 6.5 | 36.9 |
| 13 | | 85 | −25.0 | 19.5 | 31.5 |
| 14 | 86 | | 5.4 | 1.1 | 31.5 |
| 13 | | 88 | −21.7 | 19.5 | 27.1 |
| 15 | 92 | | 3.3 | −3.3 | 30.4 |
| 15 | | 94 | −34.7 | 18.4 | 27.1 |

[1] 104,340 lbs.   [2] 59,764 lbs.   [3] 11,200 p.s.i.

TABLE II

*Summary of Principal (Circumferential and Longitudinal) Coupling Stresses*

RELIEVED COUPLING

Sign convention:
+ (omitted) tension
− compression

[Note: All stresses are for final stage of loading indicated and are in thousands of pounds per square inch]

| Approx. thread No. | Gage numbers | | Loading condition: End A | | |
|---|---|---|---|---|---|
| | Circum. | Long. | Made-up | Made-up +tens.[1] | Made-up +tens.,[2] +pres.[3] |
| 2 | 68 | | 35.0 | 41.5 | 54.1 |
| 1 | | 70 | 8.7 | 21.7 | 25.0 |
| 4 | 71 | | 33.4 | 30.9 | 42.6 |
| 3 | | 73 | 8.7 | 19.5 | 22.8 |
| 6 | 74 | | 52.4 | 43.4 | 61.0 |
| 5 | | 76 | 32.6 | 48.8 | 49.9 |
| 8 | 77 | | 52.7 | 39.7 | 58.9 |
| 9 | | 79 | 20.6 | 48.8 | 36.9 |
| 10 | 80 | | 34.1 | 17.1 | 49.3 |
| 9 | | 82 | 20.6 | 48.8 | 40.1 |
| 12 | 83 | | 9.0 | 0.0 | 54.4 |
| 13 | | 85 | −16.3 | 38.0 | 62.9 |
| 14 | 86 | | −0.7 | −5.7 | 53.2 |
| 13 | | 88 | −17.1 | 31.5 | 56.4 |
| 15 | 92 | | −1.8 | −5.3 | 57.1 |
| 15 | | 94 | −19.7 | 38.0 | 65.1 |

| Approx. thread No. | Gage numbers | | Loading condition: End B | | |
|---|---|---|---|---|---|
| | Circum. | Long. | Made-up | Made-up +tens.[1] | Made-up +tens.,[2] +pres.[3] |
| 2 | 47 | | 62.1 | 51.8 | 69.8 |
| 1 | | 49 | 34.7 | 39.1 | 61.8 |
| 4 | 50 | | 81.2 | 58.4 | 79.4 |
| 3 | | 52 | 41.2 | 38.0 | 46.7 |
| 6 | 53 | | 78.6 | 61.1 | 79.1 |
| 5 | | 55 | 36.9 | 46.7 | 45.6 |
| 8 | 56 | | 68.3 | 59.1 | 74.5 |
| 9 | | 58 | 27.1 | 68.4 | 46.7 |
| 10 | 59 | | 51.0 | 41.1 | 62.4 |
| 9 | | 61 | 28.2 | 69.4 | 54.3 |
| 12 | 62 | | 17.9 | 10.7 | 57.5 |
| 13 | | 64 | −15.2 | 34.7 | 58.6 |
| 14 | 65 | | 0.0 | −4.6 | 53.5 |
| 13 | | 67 | −25.0 | 31.5 | 55.3 |
| 15 | 95 | | −2.8 | −5.3 | 56.3 |
| 15 | | 97 | −20.0 | 41.2 | 66.2 |

[1] 104,340 lbs.   [2] 59,764 lbs.   [3] 11,200 p.s.i.

TABLE III

*Summary of Stresses Inside Relieved Coupling*

Sign convention:
+ (omitted) tension
− compression

[Note: All stresses are for final stage of loading indicated and are in thousands of pounds per square inch]

| End | Approx. thread No. | Gage numbers | | Make-up | Make-up +tens.[1] | Make-up +tens.,[2] +pres.[3] |
|---|---|---|---|---|---|---|
| | | Circum. | Long. | | | |
| A | 15 | 149 | | Highest stress only about 20,000 p.s.i., others not computed. | −2.2 | 57.5 |
| | 15 | | 151 | | 62.9 | 41.2 |
| | 15 | 152 | | | −6.5 | 61.8 |
| | 15 | | 154 | | 57.4 | −10.9 |
| | 15 | 155 | | | 41.2 | 80.3 |
| B | 15 | | 157 | | 77.0 | 15.2 |
| | 15 | 158 | | | −3.3 | 27.1 |
| | 15 | | 160 | | 62.9 | 11.9 |

[1] 104,340 lbs.   [2] 59,764 lbs.   [3] 11,200 p.s.i.

TABLE IV

*Summary of Principal (Circumferential and Longitudinal) Tubing Make-Up Stresses*

STANDARD COUPLING

Sign convention:
+ (omitted) tension
− compression

[Note: All stresses are in thousands of pounds per square inch. Stresses not computed for handtight, ½ turn, 1 turn due to similarity to those for tubes in relieved coupling]

| Tubing end No. | Approx. thread No. | Gage numbers | | Number of turns | |
|---|---|---|---|---|---|
| | | Circum. | Long. | 1½ | Full make-up, 1⅞ |
| | | | | Torque | |
| | | | | 904' # | 1,263' # |
| Tubing end 3, coupling end A. | 1 | 135 | | −52.1 | −65.0 |
| | 2 | | 137 | 13.0 | 22.0 |
| | 2 | 138 | | −53.1 | −68.0 |
| | 3 | | 140 | 28.2 | 45.0 |
| | 4 | 141 | | −59.7 | −91.0 |
| | 5 | | 143 | 43.4 | 66.0 |
| | 5 | 144 | | −59.7 | −89.0 |
| | 6 | | 146 | 48.8 | 56.0 |

| Tubing end No. | Approx. thread No. | Gage numbers | | Number of turns | | |
|---|---|---|---|---|---|---|
| | | Circum. | Long. | 1½ | 2 | Full make-up, 2⅜ |
| | | | | Torque | | |
| | | | | 718' # | 1,162' # | 1,263' # |
| Tubing end 4, coupling end B. | 2 | 123 | | −73.8 | −133 | −130 |
| | 5 | | 125 | 54.3 | 73.8 | 78.0 |
| | 6 | 126 | | −73.8 | −109 | −114 |
| | 7 | | 128 | 3.3 | 20.6 | 25.0 |
| | 10 | 129 | | −2.6 | −48.8 | −53.0 |
| | 11 | | 131 | −2.0 | −32.6 | −36.0 |
| | 13 | 132 | | −1.1 | −7.4 | −11.0 |
| | 13 | | 134 | −6.5 | −16.0 | −19.0 |

NOTE.—'# stands for foot-pounds.

TABLE V

*Summary of Principal (Circumferential and Longitudinal) Tubing Make-Up Stresses*

RELIEVED COUPLING

Sign convention:
+ (omitted) tension
− compression

[Note: All stresses are in thousands of pounds per square inch]

| Approx. thread No. | Tubing end No. | Gage numbers | | Number of turns | | | | | |
|---|---|---|---|---|---|---|---|---|---|
| | | Circum. | Long. | Hand tight | ½ | 1 | 1½ | 2 | Full make-up, 2¼ |
| | | | | Torque | | | | | |
| | | | | 50′ # | 206′ # | 371′ # | 627′ # | 1,060′ # | 1,405′ # |
| 1 | Tubing end 1, coupling end B. | 135 | | −10.3 | −23.8 | −31.5 | −33.6 | −18.4 | −24.0 |
| 2 | | | 137 | 1.4 | −2.2 | 18.4 | 27.1 | 53.0 | 54.0 |
| 3 | | 138 | | −6.3 | −15.2 | −32.6 | −40.1 | −54.5 | −60.0 |
| 4 | | | 140 | −.9 | 10.9 | 20.6 | 42.3 | 57.8 | 7.6 |
| 4 | | 141 | | −3.9 | −16.3 | −38.0 | −52.1 | −64.5 | −76.0 |
| 5 | | | 143 | 2.6 | 11.9 | 26.0 | 45.6 | 89.0 | 132.0 |
| 5 | | 144 | | −5.1 | −15.2 | −37.9 | −54.3 | −85.9 | −98.0 |
| 6 | | | 146 | 2.6 | 13.0 | 28.2 | 59.7 | 125.0 | 154.0 |

| Approx. thread No. | Tubing end No. | Gage numbers | | Number of turns | | | | |
|---|---|---|---|---|---|---|---|---|
| | | Circum. | Long. | Hand tight | ½ | 1 | 1½ | Full make-up, 1¾ |
| | | | | Torque | | | | |
| | | | | 50′ # | 206′ # | 583′ # | 1,083′ # | 1,405′ # |
| 2 | Tubing end 2, coupling end A | 123 | | −6.0 | −21.7 | −40.1 | −59.7 | −63.0 |
| 3 | | | 125 | 0.8 | 19.5 | 20.6 | 41.2 | 45.0 |
| 6 | | 126 | | 1.8 | −7.6 | −29.3 | −49.9 | −63.0 |
| 7 | | | 128 | 1.6 | 1.1 | −5.4 | −5.4 | −9.8 |
| 10 | | 129 | | −1.4 | −1.3 | −7.4 | −19.5 | −25.0 |
| 11 | | | 131 | 0.6 | −1.2 | −7.6 | −18.4 | −19.0 |
| 13 | | 132 | | −0.3 | 2.5 | 1.3 | −1.2 | −2.0 |
| 13 | | | 134 | −.9 | 2.2 | −0.8 | −6.1 | −8.0 |

A study of the above tables and graphs 2B and 3B reveal several interesting facts. Circumferential stresses in the tubes made-up in the relieved coupling for 1½ turns and more was substantially less than circumferential stresses in the tubes made-up in the standard coupling. Significantly, the stress patterns in the tubes behaved differently as the tubes were made-up. As the tubes were advanced into the coupling, the circumferential stress in the tubes in the standard coupling increased to a much higher value than did the longitudinal stress. In the tubes of the relieved collar, the reverse is true, the longitudinal stress begins to exceed the circumferential stress. Compiled below in Table VI is a comparison of maximum circumferential and longitudinal stresses in the several tubes.

TABLE VI

*Comparison of Maximum Tube Stresses in Thousands p.s.i.*

1½ TURNS

| Tube No. | Relieved coupling | | Standard coupling | |
|---|---|---|---|---|
| | 1 | 2 | 3 | 4 |
| Circum | −54.3 | −59.7 | −59.7 | −73.8 |
| Long | 59.7 | 41.2 | 48.8 | 54.3 |

2 TURNS

| Circum | −85.9 | | | −133 |
|---|---|---|---|---|
| Long | 125 | | | 73.8 |

FULL MAKE-UP (AS INDICATED)

| Turns | (2¼) | (1¾) | (1⅞) | (2½) |
|---|---|---|---|---|
| Circum | −98 | −63 | −91 | −130 |
| Long | 154 | 45 | 66 | 78 |

At 1½ turns, it will be noted that the maximum longitudinal stress of tube 1 already exceeds the maximum circumferential stress. In tubes 3 and 4, circumferential stress is greater than longitudinal stress and in tube 4 has already reached a very high value. At 2 turns, the maximum longitudinal (125,000 p.s.i.) stress of tube 1 exceeds the circumferential (−85,900 p.s.i.) stress by 39,000 p.s.i., whereas the maximum circumferential (−133,000 p.s.i.) stress of tube 4 exceeds the longitudinal (73,800 p.s.i.) stress by 59,200 p.s.i. The maximum circumferential (−85,900 p.s.i.) and longitudinal (125,000 p.s.i.) stress at 2 turns for tube 1 occurred in the vicinity of threads 5 and 6. The stress pattern for tube 4 at 2 turns in the vicinity of threads 5 and 6 was the reverse of the pattern for tube 1, being −114,000 p.s.i. circumferential and 78,000 p.s.i. longitudinal. The same relationship appears in the stresses in the tubes when fully made-up. Tube 2 advanced only 1¾ turns and its longitudinal stress never exceeded the circumferential stress. On the other hand, its circumferential stress never exceeded the elastic limit of the material. Note that tube 4 was in collapse over a major portion of its length and for a substantial portion of its length the ultimate strength of the tube was exceeded. This tube might be said to have been in a complete state of collapse over the first five or six threads of the tube. The reduced elastic contact between tube 4 and the coupling seriously impaired the sealing characteristics of the joint.

The comparison of maximum tube stresses of tubes 1 and 2 shows that as the tubes begin to approach the elastic limit, the circumferential stress goes up much slower than longitudinal stress. This would indicate that the primary cold flow of material when the tube is stressed beyond its elastic limit is caused by longitudinal stress.

In other words, tubes made-up in standard collars collapse circumferentially and lose their elastic contact with the collar. The relieved collar tubes when forced beyond the elastic limit of the material stretch longitudinally, but maintain their elastic contact with the collars. The difference in stress pattern between the tubes within the standard and relieved collars is due to the provision of a space within the relieved collar for receiving the end of the tubes. The effect of this relief is to permit the end of the tube to provide a support for the intermediate section of the tube which supports it against collapse.

It should be noted that excessive longitudinal stress should be avoided if possible where the coupling is to be subjected to extreme longitudinal load. The coupling tested withstood an axial pull of 104,340 pounds indicating that though over stressed longitudinally, the coupling will withstand considerable pull.

Referring to FIG. 2, it will be noted that the hand-tight position of tube 1 and tube 2 differs. Tube 2 has its nose positioned at the small diameter end of the internal thread system. As this tube was rotated to full made-up position, a portion of the tube projected into the groove in the collar and provided sufficient support for the tube to permit it to be rotated 1¾ turns without collapsing the tube. Tube 1 projected beyond the small diameter end of the collar thread approximately 1½ threads and although the tube was rotated 2¼ turns and the stress curves show that circumferential stresses exceeded the yield point of the material, the end of the tube remained in firm elastic contact with the collar and only a slight permanent set in the intermediate section of the threads resulted. As the thread system illustrated by tube 1 remains in firm elastic contact when overtightened, it is preferred to provide that the tube project into the recess when in hand-tight position.

Referring to FIGS. 4, 4A, 5 and 5A, the permanent set in the tubes and coupling is shown. The ordinate of graph 4A is laid out in 0.010 of an inch and the machined diameter of 3.059 inches of the relieved collar is indicated by the dashed line. The solid line extending across the graph is the measured outside diameter of the collar after the specimens had been completely tested and broken down. Below the collar indicia is the indicia for each tube. The dashed lines represent the machined diameter of the threaded portion of the tubes. The two solid lines at the bottom of the graph represent the measured diameter of the threaded section of the tubes after they had been broken out. The graph is correlated with the thread systems shown in FIG. 4. Graph 5A is similar to graph 4A and the dashed and solid lines indicate machined and final measured diameters of the parts as explained in conjunction with the graph of FIG. 4A.

Referring first to the graph of tube 2, which it will be recalled rotated 1¾ turns and was not indicated by the strain gauges to have exceeded the elastic limit of the material, it will be noted that only a slight permanent set appears in the tube threads. The maximum amount of set was approximately 0.002 of an inch and the tube remained in firm elastic contact with the coupling throughout the entire thread system. Referring to tube 1, which turned 2¼ turns and was indicated to be stressed beyond the elastic limit of the material, it will be noted that the permanent set appears only at the center section of the tube thread and then is a maximum of only 0.005 of an inch. Attention is directed to the resemblance of the measured diameter of tube 1 after it had been broken out of the coupling to a cantenary curve.

The diameter curve for tube 1 indicates that loading of the thread system was substantially constant along the length of the thread system. Even though this tube was turned a greater number of turns than any other of the four tubes, the tube remained in firm elastic contact with the coupling. Thus, utilizing this invention, a thread system may be made-up for approximately 1¾ turns and good elastic contact will be maintained along the entire thread system and the percentage of complete seals against high pressure will be very high. It is believed that 2¼ turns is excessive and it will not normally be desirable to make-up the tube this tight. However, if the tube is made-up this tight, it will not collapse and the percentage of leak-free joints will still be much greater than in a standard coupling. At this time, it might be pointed out that although no stresses above the yield point were obtained from strain gauge measurements for the couplings, the diameter measurements clearly show permanent set for three ends of the two couplings. It is not believed that any conflict or discrepancy exists in this statement, as it is believed that stresses higher than those measured existed at the threads in the couplings and probably in the tubes as well.

Let us now note the condition of the standard collar and the tubes made-up therein after they were broken out. Tube 3 was made-up 1⅞ turns and the stress curves show that the tube wall was forced into collapse. The diameter curve for the tube shows this collapse to have caused approximately 0.003 of an inch set in the tube along the entire length of thread engagement with the collar. This should be compared with tube 1 in which a permanent set of approximately 0.002 of an inch occurred only over the first 3 or 4 threads.

The condition of tube 4 shows what happens in a standard collar when the tube is made-up too tight in an attempt to obtain a seal against high pressure. The collapse begins at the end of the tube in the amount of approximately 0.009 of an inch and extending almost in a straight line to the first perfect thread on the collar. This tube was in collapse over substantially the entire thread system. This should be compared with the condition of tube 1 in which the tube remained in firm elastic contact with the ends of the internal thread and only took a maximum permanent set of .005 of an inch.

The condition shown in FIG. 5 is probably one of the primary reasons for the large number of reworks necessary in standard thread systems.

Referring now to FIG. 6, there is shown a comparison of thread contact pressure in the B end of the standard coupling and in the B end of the relieved coupling as fully made-up. This graph is a ratio of the contact pressure to an internal pressure of 11,000 p.s.i. per turn, this pressure being approximately the internal pressure to which the specimens were subjected. The ratios were computed from data supplied by the tests. Curve 16 is the curve of the B end of the standard coupling. Thread contact pressure per turn exceeded internal pressure only at threads 7 and 12 of the tube and then only in very sharp peaks. The tube thread in contact with internal thread 12 was imperfect and therefore seal at this point was improbable. It is necessary to have a seal extending continuously over a minimum of one and one-half threads to obtain a seal. It can readily be seen that the likelihood of leaks in the B end of the standard coupling is very great due to the sharp peaks of high contact pressure. Even if it does not leak when first made-up, the chances of this thread system leaking due to vibrations, and the like, in service would be great. This is particularly true if the thread system be employed in a well string of tubing where it will be subjected to tremendous tension as well as vibration.

Curve 17 shows the contact pressure ratio per turn between the tube and coupling at the B end of the relieved coupling. Along the entire length of the thread system, the thread contact pressure per turn was greater than internal pressure. The thread contact pressure curve indicates that contact pressure gradually increased from one end of the thread system to an intermediate point and then gradually decreased. The increase and decrease was substantially uniform. The thread contact pressure of the relieved coupling end B is much higher than necessary to provide a seal and even though the tube be overtightened in a relieved collar, this curve shows that the percentage of reworks will be minor.

From the above, it will be seen that the objects of this invention have been attained. There has been provided a thread system which will require a very small percentage of reworks. This is true even though the thread system is overtightened. The condition of the internal and external threads after the thread system had been broken out shows that the thread system may be used and re-used and will continue to provide a seal against high pressure. Even where the thread system has been tightened excessively, the tubing is not collapsed and upon making up the joint the second time, the tubing will still be in firm elastic contact with the coupling.

Providing a groove at the small diameter end of the internal thread and permitting the end of the tube to project into the groove as the tube is made-up, completely changes the stress pattern of the thread system as compared to a conventional thread system. In the conventional thread system, overtightening of the tube caused collapse. In the thread system of this invention, the tube is supported against collapse and overtightening causes the tube to give longitudinally instead of collapsing. Stated another way, it may be said that overtightening of a particular joint at least by some workmen must be expected. This invention provides a thread system which will permit this over-tightening without collapsing the pipe. The over-stress due to excessive torque is primarily exerted in a longitudinal direction which does not seriously impair the sealing ability of the thread system.

The circumferential loading of the tube is much more constant along the thread system. The thread contact pressure uniformly increases along the thread system to a maximum and then decreases. A sealing contact pressure is maintained along the entire thread system instead of across one or two areas as in the standard coupling.

It will be appreciated that groove 13 may take any desired shape in which it is out of contact with the nose of the tubes as they advance through the thread system. It will further be appreciated that while it is desired to have approximately one thread length of tubing projecting beyond the internal thread in hand-tight position, that the test results given herein show that this is not necessary to obtain beneficial results. Note tube 2. The tube may be positioned with its end substantially at the small diameter end of the internal thread of the collar and the results of this invention attained.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A tapered thread system comprising, male and female members having external and internal mating threads respectively formed on substantially the same taper, the thread of the male member being of such size and extent as to engage substantially all of the thread of the female member when the thread system is made up hand tight, said female member having an internal annular groove at the small diameter end of the internal thread of a width and depth to receive the end of the male member as the members are rotated to full made up position, the interengagement of the threads constituting the only limitation on the extent of make-up.

2. A pipe joint comprising, a coupling and pipe having mating tapered threads, said pipe thread being of such size and extent as to extend through and engage substantially all of the thread of the coupling when the pipe and coupling are made up hand tight, said coupling having an internal annular groove at the small diameter end of the coupling thread of a width and depth to receive freely the end of the pipe as the pipe and coupling are rotated to full made-up position, the interengagement of the threads constituting the only limitation on the extent of make-up.

3. A threaded joint for containing fluid under pressure comprising, a coupling and pipe, both made of steel, and having mating tapered threads, the threads of the coupling and pipe being so related that when made up hand tight the coupling thread is in engagement with the pipe thread substantially throughout the length of the coupling thread, the pipe thread being longer than the coupling thread, said coupling being relieved adjacent the small diameter end of its thread to a dimension at least as great as the diameter of its thread root at said small diameter end, said relief having a longitudinal dimension and diameter sufficient to permit full make-up of the coupling and pipe without engagement of the recess wall by the pipe end or threads, the wall of the coupling at the recess providing a mechanical load bearing means for connecting the threaded end to a fluid passageway, the interengagement of the threads of the pipe end and coupling constituting the only limitation on the degree of make-up, the relative thickness of the pipe wall and coupling wall at their respective threads and the materials thereof being so proportioned that the coupling will expand and the pipe will contract at their threaded engagement as the joint is made up to distribute the deformation between the coupling and pipe thereby reducing the likelihood of overstressing the pipe, whereby in making up the joint the thread system of the coupling and pipe is substantially uniformly loaded to place the coupling in hoop tension and to place the pipe in hoop compression throughout their threaded engagement.

4. The pipe joint of claim 3 wherein the pipe is a length of well pipe and the coupling is a collar for use in joining adjacent ends of two lengths of such pipe, said collar having a second thread at its other end tapering in an opposite direction but substantially aligned along its longitudinal axis with the first internal thread and otherwise being substantially the same as the first thread in length and size, the collar being relieved adjacent the small diameter end of the second thread to a dimension at least as great as the diameter of its thread root at said small diameter end and having a longitudinal dimension and diameter sufficient to permit full make-up of the collar on said threaded pipe, the distance between said two internal threads being great enough to simultaneously accommodate said first threaded pipe and a second similarly threaded pipe both made up without contact between the two pipes.

5. A pipe connector comprising, a steel collar having an internally threaded, annular, pipe receiving socket, the thread of which is tapered inwardly and conforms to some thread standard of lead, taper and form, the thread however being substantially shorter than provided for by said standards and being gauged for hand tight and greater receipt throughout its length of a correspondingly threaded male member; said collar having a second threaded socket at its other end tapering in an opposite direction and otherwise being substantially the same as the first threaded socket in length and size, an internal groove in the wall of the collar relieving the threads between their small diameter ends, the diameter of the groove adjacent each of the threads being at least as great as the root diameter of the adjacent threads, the longitudinal dimension of the groove and its diameter being sufficient that upon make-up with pipe ends the interengagement of the threads constitutes the only limitation of the degree of make-up, the material and wall thickness of the connector at the threads being such that the wall may expand under stress due to make-up, whereby when made up the connector is substantially uniformly loaded to place it in hoop tension over its thread area.

References Cited in the file of this patent

UNITED STATES PATENTS

| | | |
|---|---|---|
| 263,943 | Morse | Sept. 5, 1882 |
| 1,226,921 | Stewart | May 22, 1917 |
| 1,281,977 | Kelley | Oct. 15, 1918 |
| 1,889,868 | Montgomery | Dec. 6, 1932 |
| 2,308,066 | Evans | Jan. 12, 1943 |
| 2,353,477 | Koppel | July 11, 1944 |
| 2,711,913 | Jungblut | June 28, 1955 |
| 2,745,685 | Moore | May 15, 1956 |
| 2,781,206 | Raglund | Feb. 12, 1957 |

OTHER REFERENCES

Cranes Catalog No. 52, "Crane Valves-Fittings, Pipe," page 367, 1936. (Copy in Div. 57.)